United States Patent [19]
Lee

[11] 3,819,133
[45] June 25, 1974

[54] AIRCRAFT FLAP SYSTEM

[75] Inventor: Norman Lee, Saint Annes-on-Sea, England

[73] Assignee: British Aircraft Corporation Limited, London, England

[22] Filed: Mar. 9, 1972

[21] Appl. No.: 233,172

[30] Foreign Application Priority Data
Mar. 12, 1971 Great Britain.................... 6722/71

[52] U.S. Cl. ........................................ 244/42 DA
[51] Int. Cl. ............................................ B64c 3/50
[58] Field of Search ........ 244/42 D, 42 DA, 42 DB, 244/42 DC, 42 R, 42 CB; 74/89.14, 89.15

[56] References Cited
UNITED STATES PATENTS
2,579,534  5/1948  Anderson et al. ............. 244/42 DB
3,568,957  3/1971  Wood ........................... 244/42 DB

*Primary Examiner*—George E. A. Halvosa
*Assistant Examiner*—Sherman D. Basinger
*Attorney, Agent, or Firm*—Cushman, Darby & Cushman

[57] ABSTRACT

In an aircraft, a lift-increasing flap system includes a flap carried on units which each comprise an actuator with a body and a ram capable of both relative linear movement to cause bodily movement of the flap and of relative rotational movement to cause a swinging movement of the flap, there being provided means to effect at least two different ratios of flap bodily movement to flap swinging movement so that during one portion of flap bodily movement the flap is swung at one rate and during another portion the flap is swung at a different rate.

5 Claims, 3 Drawing Figures

PATENTED JUN 25 1974 3,819,133
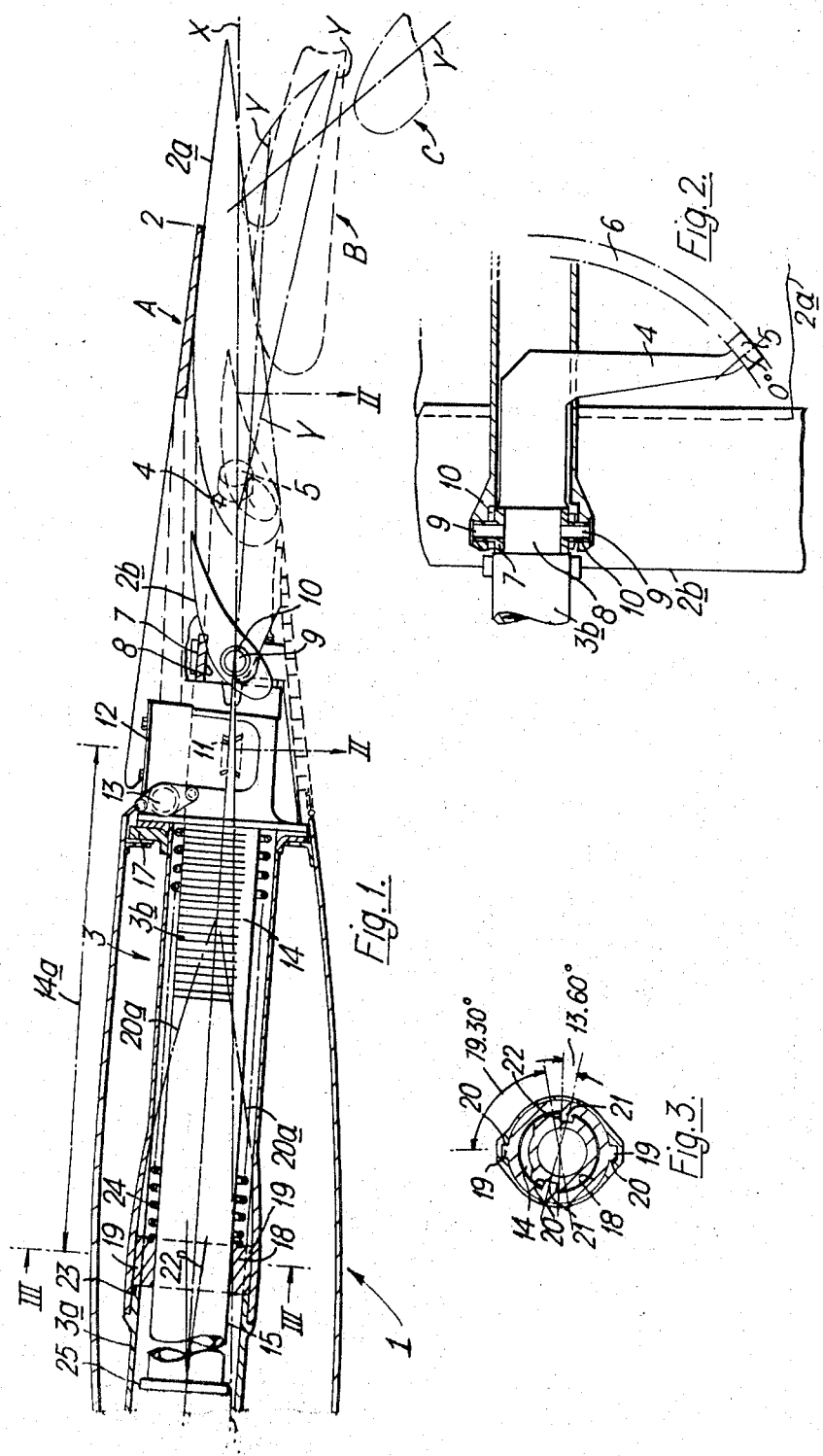

AIRCRAFT FLAP SYSTEM

This invention relates to aircraft lift-increasing flap systems.

According to the present invention an aircraft lift-increasing flap system includes in combination a flap and a mechanism for extending and retracting the flap from and toward an aircraft wing, the mechanism having an actuator with a body and a ram capable of both relative linear movement to cause bodily movement of the flap and of relative rotational movement to cause a swinging movement of the flap, and means providing at least two different ratios of flap swinging movement to flap bodily movement such that during one portion of flap bodily movement the flap is swung at one rate and during another portion of flap bodily movement the flap is swung at a different rate.

In one preferred embodiment there are two distinct ratios of flap swinging movement to flap bodily movement, that is to say, for a constant rate of flap bodily movement, the flap swings at one or other of two different rates.

In this case the actuator body is in the form of a fixedly mounted cylindrical sleeve and the ram is of circular cross-section lying partly within the body, and the means for effecting the different ratios of flap swinging movement and flap bodily movement include a helical screw formation on the interior of the body and a further helical screw formation on the exterior of the ram, an annular nut lying between the body and the ram and being correspondingly formed to co-operate with both formations, and an abutment means on the ram, the helix angles of the formation being such that on linear movement from the flap fully retracted position, the ram initially passes through the nut which does not move relative to the body and the ram is thereby rotated at a rate dictated by the helix angle of the formation on the ram, and on further linear movement the nut is engaged by the abutment means and is carried along by the ram which is caused to rotate with the nut at a rate dictated by the helix angle of the formation on the body.

Preferably linear movement of the ram is effected by means including a pinion gear and a rack formed on the ram engaged by the pinion gear.

A preferred embodiment of the invention is now described with reference to the accompanying drawings. In these drawings:

FIG. 1 is a part-sectional elevation of a flap system.

FIG. 2 is a sectional view on line II—II of FIG. 1, and,

FIG. 3 is a sectional view on line III—III of FIG. 1.

An aircraft wing 1 has a lift increasing flap 2 which is extendable from and retractable into the trailing edge region of the wing. In the fully retracted position (shown at A in FIG. 1) the flap 2 conforms with the contour of the aerofoil section of the wing. The flap 2 is of the slotted type having a main member 2a and a vane 2b spaced forwardly from the main member.

The flap is actuated by a plurality of actuating mechanisms spaced span-wise along the flap. Since these are substantially identical only one example is illustrated.

The mechanism has an actuator member 3 which lies generally chordwise of the wing and includes a body 3a and a ram 3b, the ram having at its aft end a crank arm 4. The crank arm 4 has a roller 5 at its tip engaging with an arcuate track 6 formed in the flap 2.

The flap 2 is pivoted at its forward end to the ram 3b and moves bodily with the ram. The pivot arrangement includes a collar 7 lying in a groove 8 formed in the ram 3b, the collar 7 having laterally extending spigots 9 which engage in bearing sockets 10 provided in the flap 2. The ram 3b can thus rotate without transmitting its rotational movement to the flap through its pivot, but when moved linearly along its axis the ram 3b translates the flap 2 bodily in a fore-and-aft direction. Rotation of the ram 3b causes the crank arm 4 to swing arcuately, the engagement of the roller 5 with the track 6 causing an angular swinging movement of the flap about its pivot (items 9 and 10).

From the generally horizontal position of FIG. 2, the crank arm 4 is swung arcuately downwards about the axis of the ram 3b as the ram rotates. Because the flap 2 is pivoted about a generally transverse horizontal axis on the spigots 9, engagement of the roller 5 with the track 6 formed on the flap will cause the flap to be depressed as it pivots upon the spigots 9.

Linear movement of the ram 3b and hence the flap 2 is achieved by means of a rack and pinion arrangement, the pinion, referenced 11, being driven through a gear box 12 by a rotatable shaft 13 extending span-wise of the wing. The pinion 11 engages a rack 14 shown in part in FIG. 1, formed on the surface of the ram 3b. The rack 14 is of such a width (i.e. it extends around the periphery of the ram 3b) that although the ram rotates the pinion 11 always engages a part of the rack 14. The full length of the rack 14 is shown by the arrow 14a.

The body 3a is in the form of a tubular sleeve and is mounted co-axially over the forward end portion 15 of the ram 3b (i.e. that end remote from the flap 2). The body 3a is anchored to the wing structure at its rearward end at 17. Between the body 3a and the ram 3b is located an annular nut member 18. This is formed with two diametrically opposite helical splines 19 on its outer surface which are so dimensioned to slidably engage corresponding helical grooves 20 (FIG. 3) formed in the inner surface of the body 3a. In FIG. 1 the centre lines only of the grooves 20 are indicated by broken lines 20a. The nut 18 is further formed with two diametrically opposite helical splines 21 on its inner surface which are so dimensioned to slidably engage corresponding helical grooves 22 formed on the outer surface of the ram 3b.

The grooves 20 terminate at their forward ends at 23 (FIG. 1) and the nut 18 is biased toward this point 23 by means of a coil spring 24 lying between the ram 3b and the body 3a.

The ram 3b has on its foremost end, an abutment 25 which, as the actuator moves aft, engages the nut 18 and carries it along with it against the bias of the spring 24.

The helix angle of the grooves 22 is chosen to give 13.60° ram rotation during linear movement of the ram from the fully retracted flap position (shown at A in FIG. 1) to an intermediate position (shown at B), that is to say a linear distance of 6.40° inches. The ram 3b rotation gives a downwardly trailing flap angle of 12° measured between the wing chord line X—X and the flap chord line Y—Y. In the flap fully retracted position these chord lines coincide. During this portion of linear movement the ratio of flap swinging movement to flap bodily movement is 12°/6.40", i.e. 1.88° for each 1 inch of linear movement.

The helix angle of the grooves 20 is chosen to give a further 79.30° of ram rotation during further linear movement of the ram from the intermediate flap position (shown at C in FIG. 1), that is to say a further linear distance of 10.60 inches. This further ram rotation gives a further downward swinging movement of the flap of 38° giving a final downwardly trailing flap angle of 50°, again measured between the chord lines X—X and Y—Y. During this portion of linear movement, the ratio of flap swinging movement to flap bodily movement is 38°/10.60 inches, i.e. 3.58° for each 1 inch of linear movement.

From this it is apparent that the helix of the grooves 22 is much more coarse than that of the grooves 20. This feature is utilised, with the aid of the spring 24, to ensure correct sequence of operation of the mechanism for the various flap settings.

The operation of the mechanism is as follows:

Assuming the flap 2 to be in the fully retracted position A of FIG. 1, the shaft 13 is rotated to drive the pinion 11 in the appropriate direction to urge the ram 3b linearly rearwards by engagement with the rack 14. Initially this linear movement causes the ram 3b to slide through the nut 18 which remains stationary with reference to the body 3a at the ends 23 of the grooves 20. This is because the helix of the grooves 22 on the ram 3b is coarser than that of the grooves 20 and thus offers less resistance to sliding movement. The reaction between the grooves 20 and the splines 21 on the nut causes rotation of the ram 3b. This rotation causes the crank arm 4 to rotate (that is to say, swing) downwards, the co-operation of the roller 5 with the track 6 simultaneously causing a downward swing movement of the flap to the position shown at B in FIG. 1. In this position of the flap 2 the flange 25 is just about to contact the nut 18.

Further rearward linear movement of the ram 3b causes the flange 25 to fully contact the nut 18 and to thus carry the nut along with the ram. The nut 18 thus moves relatively to the body 3a and the raction between the grooves 20 and the splines 19 causes rotation of the nut 18 and hence the ram 3b. The crank arm 4 also rotates downwards a further amount and downwardly swings the flap to the position shown at C in FIG. 1.

Retraction of the flap is achieved in exactly the reverse of the extension operation described.

The spring 24 is primarily provided to ensure that the nut 18 is always biased towards the points 23 and towards the flange 25 on the ram 3b. This ensures that despite variations in the forces opposing extension and retraction of the flaps, for example, in those conditions where there is no aerodynamic load counteracting the weight of the flaps, the correct operational sequence continues to be followed.

By the mechanism described a relatively simple and robust flap system is provided. It has the advantage that the mechanism does not protrude from the wing contour in the fully retracted position and thus does not require bulky fairings. The mechanism is accordingly especially suitable for variable sweep back winged aircraft.

I claim:

1. An aircraft lift-increasing flap system, including in combination:

a flap and a mechanism for extending and retracting the flap from and toward an aircraft wing, the mechanism having an actuator for effecting both a bodily and a swinging movement of the flap and to effect two distinct ratios of such bodily movement to such swinging movement, the actuator having a cylindrical sleeve member with a helical screw thread formation on the interior thereof;

a rod-like member lying co-axially partly within the sleeve member with a helical screw thread formation on the exterior thereof, one member being fixed with respect to the wing and the other being relatively movable and carrying the flap;

an annular nut lying between the two members and formed to cooperate with both thread formations thereon, and an abutment on the flap-carrying member, the helix angles of the formations being such that on linear movement from the flap fully retracted position, the flap-carrying member moves relatively to the nut, which does not move relatively to the fixed member, and is rotated at a rate dictated by the helix angle of the thread formation thereon, and on further linear movement the nut is engaged by the abutment means and is carried along the flap-carrying member which is caused to rotate with the nut at a rate dictated by the helix angle of the thread formation on the fixed member.

2. An aircraft lift-increasing flap system according to claim 1 wherein the actuator fixed member is formed by the cylindrical sleeve and forms an actuator body, and the flap-carrying member is formed by the rod-like member which forms an actuator ram.

3. An aircraft lift-increasing flap system according to claim 2 wherein linear movement of the ram is effected by means including a pinion gear and a rack formed on the ram.

4. An aircraft lift-increasing flap system according to claim 2 in which the ram has anchorage means to pivotally carry the flap such that it moves bodily with the ram, the ram further having a crank arm and the flap having a trackway engaged by the crank arm such that rotation of the ram and of the crank arm causes swinging movement of the flap.

5. An aircraft lift-increasing flap system according to claim 4 in which the anchorage means includes a collar on the ram anchored against axial movement with respect to the ram but capable of rotation relatively to it, the flap being pivoted on the collar.

* * * * *